United States Patent
Kasi et al.

(10) Patent No.: US 11,829,500 B2
(45) Date of Patent: Nov. 28, 2023

(54) FILE INTERFACE TO DYNAMICALLY MANAGE ACCESS TO REMOTE FILES

(71) Applicant: NETFLIX, INC., Los Gatos, CA (US)

(72) Inventors: Kishore Udayashankar Kasi, Milpitas, CA (US); Shailesh Birari, Campbell, CA (US); Prudhviraj Karumanchi, Milpitas, CA (US); Vikram Krishnamurthy, San Francisco, CA (US); Ioannis Papapanagiotou, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 410 days.

(21) Appl. No.: 17/013,288

(22) Filed: Sep. 4, 2020

(65) Prior Publication Data
US 2022/0075886 A1 Mar. 10, 2022

(51) Int. Cl.
*G06F 21/62* (2013.01)
*G06F 21/31* (2013.01)
*G06F 16/182* (2019.01)
*G06F 16/16* (2019.01)

(52) U.S. Cl.
CPC ........ *G06F 21/6218* (2013.01); *G06F 16/164* (2019.01); *G06F 16/182* (2019.01); *G06F 21/31* (2013.01); *G06F 2221/2141* (2013.01)

(58) Field of Classification Search
CPC ....... G06F 21/44; G06F 21/6218; G06F 21/31
See application file for complete search history.

(56) References Cited

U.S. PATENT DOCUMENTS

| | | | |
|---|---|---|---|
| 8,887,214 B1* | 11/2014 | Black | H04N 21/4112 725/86 |
| 9,906,595 B2* | 2/2018 | Nordness | H04L 67/5683 |
| 9,967,301 B2* | 5/2018 | O'Hare | H04N 21/23424 |
| 11,039,181 B1* | 6/2021 | Haritaoglu | H04N 21/2187 |
| 11,159,852 B1* | 10/2021 | Killick | H04N 21/25891 |
| 2011/0153853 A1* | 6/2011 | London | H04L 67/08 718/1 |

(Continued)

FOREIGN PATENT DOCUMENTS

WO 2015/153259 A1 10/2015

OTHER PUBLICATIONS

Nour, Boubakr, et al. "Access control mechanisms in named data networks: A comprehensive survey." Acm computing Surveys (cSuR) 54.3 (2021): 1-35. (Year: 2021).*

(Continued)

*Primary Examiner* — Kari L Schmidt
(74) *Attorney, Agent, or Firm* — Artegis Law Group, LLP

(57) ABSTRACT

Various embodiments of the present application set forth a computer-implemented method for accessing data comprising determining a manifest associated with a given user of an application, where the manifest identifies one or more assets that are accessible by the given user, for each of the one or more assets, one of a plurality of endpoint stores that stores data associated with the asset, and for each of the one or more assets, one of the plurality of endpoint stores that stores metadata associated with the asset, generating, based on the manifest, a user namespace that includes a unique reference for each of the one or more assets, and presenting the user namespace to the user.

20 Claims, 7 Drawing Sheets

(56) References Cited

U.S. PATENT DOCUMENTS

| | | | | |
|---|---|---|---|---|
| 2012/0023251 | A1* | 1/2012 | Pyle | H04L 65/65 |
| | | | | 709/231 |
| 2014/0279852 | A1* | 9/2014 | Chen | G06F 16/43 |
| | | | | 707/696 |
| 2015/0278397 | A1* | 10/2015 | Hendrickson | G06F 16/137 |
| | | | | 707/798 |
| 2016/0292443 | A1* | 10/2016 | von Muhlen | G06F 16/185 |
| 2017/0091235 | A1* | 3/2017 | Yammine | G06F 16/192 |
| 2017/0123931 | A1* | 5/2017 | Aizman | G06F 11/1448 |
| 2018/0247074 | A1* | 8/2018 | Ancin | G06F 21/6209 |
| 2018/0367299 | A1* | 12/2018 | Schütz | H04L 63/06 |
| 2019/0188408 | A1* | 6/2019 | Glik | G06F 21/6218 |
| 2019/0208014 | A1* | 7/2019 | Goldberg | G06F 16/137 |
| 2019/0228172 | A1* | 7/2019 | Ray | G06F 21/554 |
| 2020/0036599 | A1* | 1/2020 | Savov | H04L 67/561 |
| 2020/0057840 | A1* | 2/2020 | Park | H04L 9/0894 |
| 2020/0175590 | A1* | 6/2020 | Huo | H04L 9/50 |
| 2020/0210550 | A1* | 7/2020 | Park | H04L 63/062 |
| 2020/0372170 | A1* | 11/2020 | Ancin | H04L 63/105 |
| 2022/0114163 | A1* | 4/2022 | Seetharaman | G06F 16/2379 |
| 2022/0400130 | A1* | 12/2022 | Kapoor | G06F 16/9537 |

OTHER PUBLICATIONS

M. Papish, "A method for implementing dynamic, cloud-based metadata services based on a unified content ID space across a fragmented CE ecosystem," 2012 IEEE International Conference on Consumer Electronics (ICCE), Las Vegas, NV, USA, 2012, pp. 57-60 (Year: 2012).*

International Search Report for application No. PCT/US2021/042244 dated Nov. 5, 2021, 12 pages.

* cited by examiner

FILE INTERFACE TO DYNAMICALLY MANAGE ACCESS TO REMOTE FILES

BACKGROUND

Field

Embodiments of the present disclosure relate generally to distributed computing systems and, more specifically, to a file interface to dynamically manage access to remote files.

Description of the Related Art

Distributed computing systems include many different hardware and software components that operate to provide a variety of services to clients of the distributed computing systems. For example, one distributed computing system executing video production services could enable various endpoint devices to access data assets that are stored within one or more endpoint data stores, such as object storage services (OSS) or file storage services.

In various instances, an endpoint device may execute an application that requires a particular data asset to be accessible in a particular format, or in a particular location. For example, an encoding application may require that a video asset be accessible as a video file in the local or remote file system of the endpoint device. In such instances, differences between the format of a stored data asset and the requirements of the application result in certain data assets being unreadable by the application. For example, an encoding application may not be able to perform encoding tasks on audiovisual programs that are stored as objects.

Further, due to the complexities of distributed storage services, portions of a given data asset may be stored separately. In such instances, an endpoint device would need to separately request each portion in order to effectively access a given data asset. In such instances, conventional techniques may not enable the endpoint device to successfully locate each portion of a given data asset within the distributed storage system and retrieve the data asset for use by applications operating on the endpoint device.

As the foregoing illustrates, what is needed in the art is a more effective technique to mount and access data assets from a remote object storage service.

SUMMARY

Various embodiments of the present application set forth a computer-implemented method for accessing data comprising determining a manifest associated with a given user of an application, where the manifest identifies one or more assets that are accessible by the given user, for each of the one or more assets, one of a plurality of endpoint stores that stores data associated with the asset, and for each of the one or more assets, one of the plurality of endpoint stores that stores metadata associated with the asset, generating, based on the manifest, a user namespace that includes a unique reference for each of the one or more assets, and presenting the user namespace to the user.

Other embodiments include, without limitation, a computer system that performs one or more aspects of the disclosed techniques, as well as one or more non-transitory computer-readable storage media including instructions for performing one or more aspects of the disclosed techniques.

The data access application efficiently controls access to assets within a distributed storage infrastructure. In particular, by having a data access application refer to a manifest that lists the accessible assets to the user, the user may be provided with a dynamic namespace that accurately reflects the portions of the storage system that the user is allowed to access without wasting resources mapping and displaying inaccessible portions of large storage systems.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
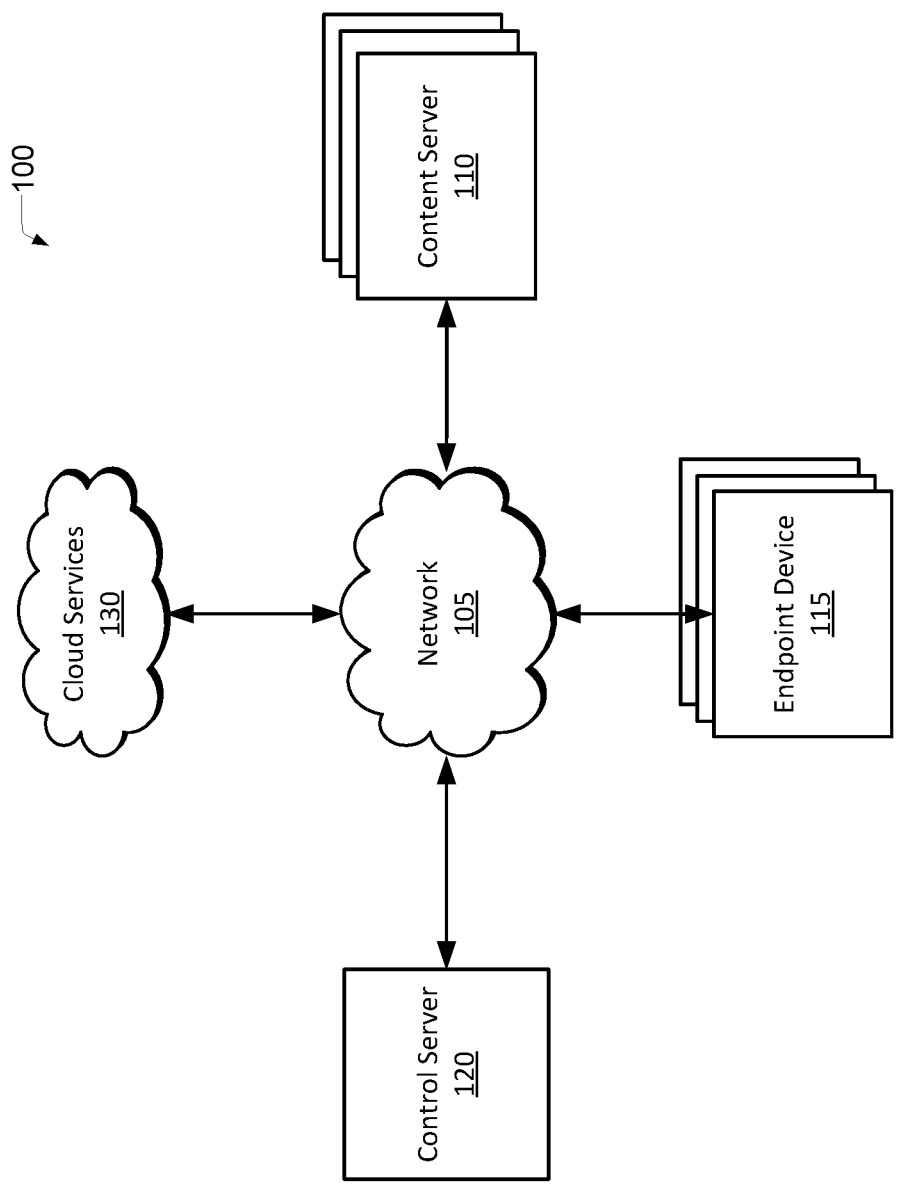
FIG. 1 illustrates a network infrastructure configured to implement one or more aspects of the present disclosure.

In the following description, numerous specific details are set forth to provide a more thorough understanding of the embodiments of the present disclosure. However, it will be apparent to one of skill in the art that the embodiments of the present disclosure may be practiced without one or more of these specific details.

Overview

Distributed computing systems include many different hardware and software components that operate to provide a variety of services to clients of the distributed computer systems. A distributed computing system executing video production services could provide users with the ability to create, access, and modify various data assets that are stored as objects in remote object storage services. For instance, a user may operate an endpoint device in order to access a video or specific scene of a video and edit the video for distribution. In another instance, one or more users may encode a video in order to prepare the video for subsequent streaming for playback. Therefore, accessing data assets that are stored in various storage services is an important component of video production.

Prior art techniques required a user or application to store all portions of a data asset together in order for other devices to successfully access the data asset. For example, conventional file systems store data portions and metadata portions of a given content item together. However, such techniques hindered storage scalability, as metadata can be stored more efficiently in a different format than the format used to store the data portions. More recently, file storage systems store data portions and metadata portions separately. For example, the Network File System (NFS) separately stores file data and file metadata. A distributed computing system could store the separate file data and file metadata in different formats in different storage systems. However, applications operating on the endpoint device have difficulty accessing the applicable portions of a given data asset. Further, such applications may not be able to read the format of both the file data and the file metadata, restricting the user from performing accessing the data assets.

In contrast, the disclosed network and associated disclosed techniques provides filtered access to a set of data assets within the storage system that are accessible to the user. A data access application in the endpoint device configures for the user a user namespace as a drive or folder within the user interface of the endpoint device that contains only data assets that are accessible to the user. The data access application configures the user-specific namespace by accessing a manifest that lists the set of data assets that are accessible to the user, as well as the locations of the data and metadata for each of the data assets within the storage systems. When the manifest updates the list of available data assets, the data access application updates the user-specific namespace to reflect the updates. When a user attempts to access a given data asset shown in the user-specific namespace, the data access application communicates with the appropriate storage devices in order to retrieve the applicable data and metadata portions. The data access application then stores the data and metadata portions locally as a file. Other applications access the locally-stored file, enabling the user to access the data asset and perform various tasks with the data asset.

For instance, a given audiovisual program could be stored as a set of separate video assets. For a given production workflow, a video editor is scheduled to perform a visual effects task on the first video asset, while a transcriber is scheduled to perform a subtitle generating task on the fourth video asset that has already been edited by the video editor. Each manifest may list only a particular video asset (e.g., the first video asset for the video editor) instead of the entire video. When the video editor attempts to access the video, data access application could refer to the manifest for the video editor to configure a user-specific namespace that only displays the first video asset. The video editor therefore can easily see the necessary video assets in her namespace without seeing large volumes of other files associated with the given audiovisual program that she is not authorized to access or edit.

The data access application addresses various limitations of conventional distributed computer networks and data access techniques. More specifically, conventional content access techniques would require that a user be given access to large portions of storage systems in order to access particular data assets. As a result, such techniques would grant users access to large caches of data assets, presenting security vulnerabilities. Further, individual users have difficulty efficiently locating data assets within a given namespace. By contrast, a distributed network that uses the disclosed data access techniques efficiently filters access to data assets based on a manifest that specifies only the data assets to which the user is currently granted access. The endpoint device within the network can therefore provide a user-specific filtered namespace in which a user can easily navigate and operate without exposing other portions of the storage system to the user.

System Overview

FIG. 1 illustrates a network infrastructure 100, according to various embodiments of the invention. As shown, the network infrastructure 100 includes content servers 110, control server 120, and endpoint devices 115, each of which are connected via communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), serverless compute engines, and/or any other technically-feasible computing platform that has network connectivity. In various embodiments, endpoint device 115 is capable of presenting content, such as text, images, audio, and/or video content, to a user. In various embodiments, endpoint device 115 may execute one or more applications to perform various video production techniques on downloaded content.

Each content server 110 could include, for example, a web server, a database (DB), and/or a server application configured to communicate with control server 120 to determine the availability and location of various files that are tracked and managed by control server 120. In various embodiments, each content server 110 may further communicate with cloud services 130 and one or more other content servers 110 in order to "fill" each content server 110 with copies of various files. In addition, content servers 110 may respond to requests for files received from one or more endpoint devices 115. The files may then be distributed from content server 110, or via a broader content distribution network (CDN). In some embodiments, content servers 110 enable a user to authenticate his or her identity (e.g., using a username and password) in order to access files stored on content servers 110. Although only one control server 120 is shown in FIG. 1, in various embodiments, multiple control servers 120 (e.g., control server 120-1, 120-2, etc.) may be implemented to track and manage files.

In various embodiments, cloud services 130 may include an online storage service (e.g., Amazon® Simple Storage Service, Google® Cloud Storage, etc.) in which a catalog of thousands or millions of files is stored and/or accessed in order to fill content servers 110. Cloud services 130 also may provide computing and/or other processing services. Although only one cloud service 130 is shown in FIG. 1, in various embodiments, multiple cloud services 130 (e.g., cloud service 130-1, 130-2, etc.) may be implemented.

Figure 2:
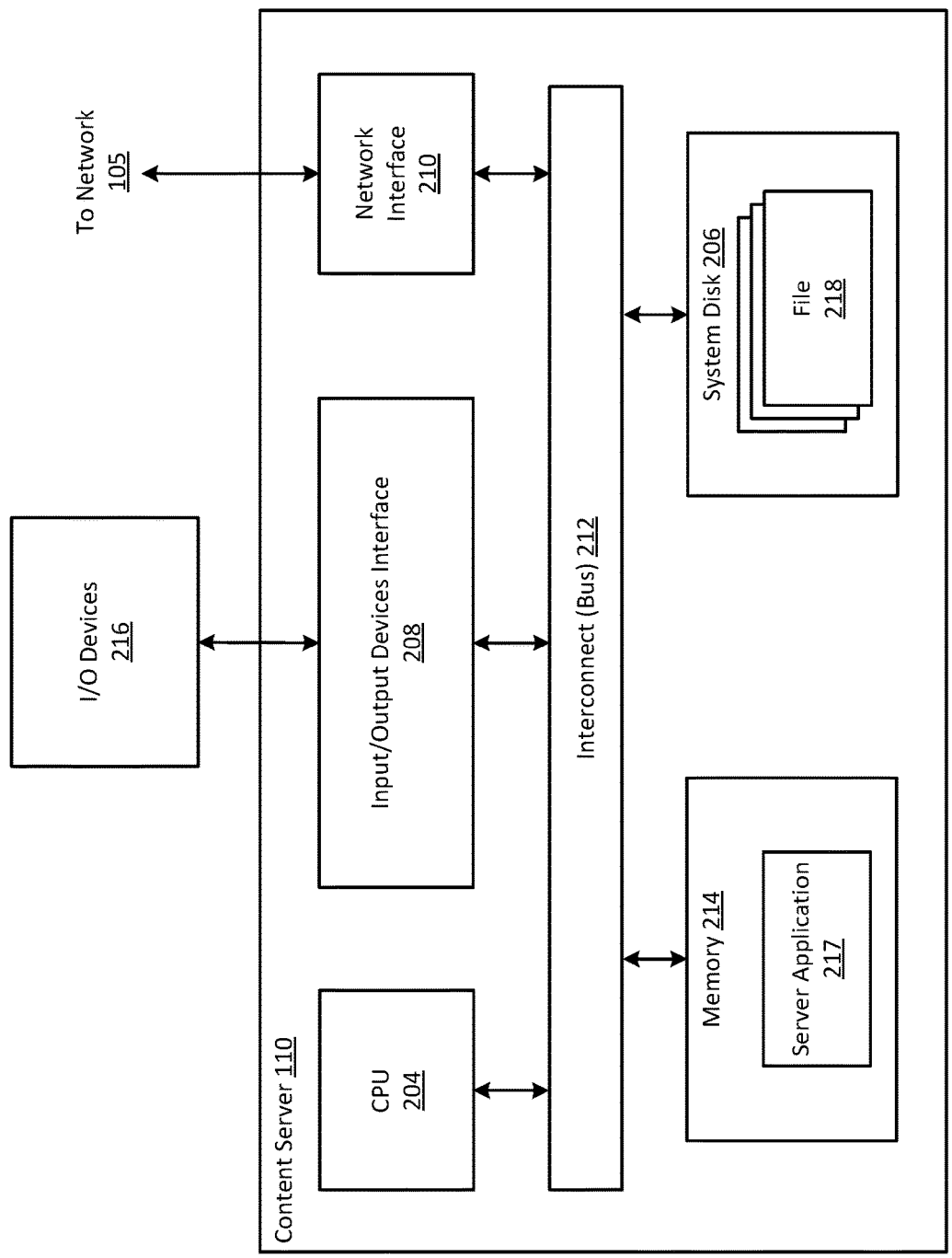
FIG. 2 is a more detailed illustration of the content server of FIG. 1, according to various embodiments of the present disclosure.

FIG. 2 is a more detailed illustration of content server 110 of FIG. 1, according to various embodiments of the present invention. As shown, content server 110 includes, without limitation, central processing unit (CPU) 204, system disk 206, input/output (I/O) device interface 208, network interface 210, interconnect (bus) 212, and system memory 214.

CPU 204 is configured to retrieve and execute programming instructions, such as server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O device interface 208, network interface 210, and system memory 214. I/O device interface 208 is configured to receive input data from one or more I/O devices 216 and transmit the input data to CPU 204 via interconnect 212. For example, the one or more I/O devices 216 may include one or more buttons, a keyboard, a mouse, and/or other input devices. I/O device interface 208 is further configured to receive output data from CPU 204 via interconnect 212 and transmit the output data to the one or more I/O devices 216.

System disk 206 may include one or more hard disk drives (HDDs), solid-state storage devices (SSDs), and/or similar storage devices. System disk 206 is configured to store nonvolatile data, such as one or more files 218 (e.g., audio files, video files, subtitles, application files, software libraries, etc.). Files 218 can then be retrieved by one or more endpoint devices 115 via network 105. In some embodiments, network interface 210 is configured to operate in compliance with one or more communications standards, such as the Ethernet standard, the Bluetooth standard, and/or one or more wireless communication standards.

System memory 214 includes server application 217, which configures content server 110, to service requests received from endpoint device 115 and other content servers 110. For example, the service request could be for one or more files 218. When server application 217 receives a service request for a specific file, server application 217 retrieves the corresponding file 218 from system disk 206 and transmits file 218 to endpoint device 115 and/or content server 110 via network 105.

File 218 could, for example, be one of a plurality of digital items, such visual content items like videos and/or still images. Similarly, file 218 could be one of a plurality of textual content items associated with one or more visual content items, such as movie metadata. In various embodiments, file 218 may be a one of a plurality of secure application data items associated with one or more content items and/or applications being executed by content server 110, control server 120, and/or endpoint device 115.

Figure 3:
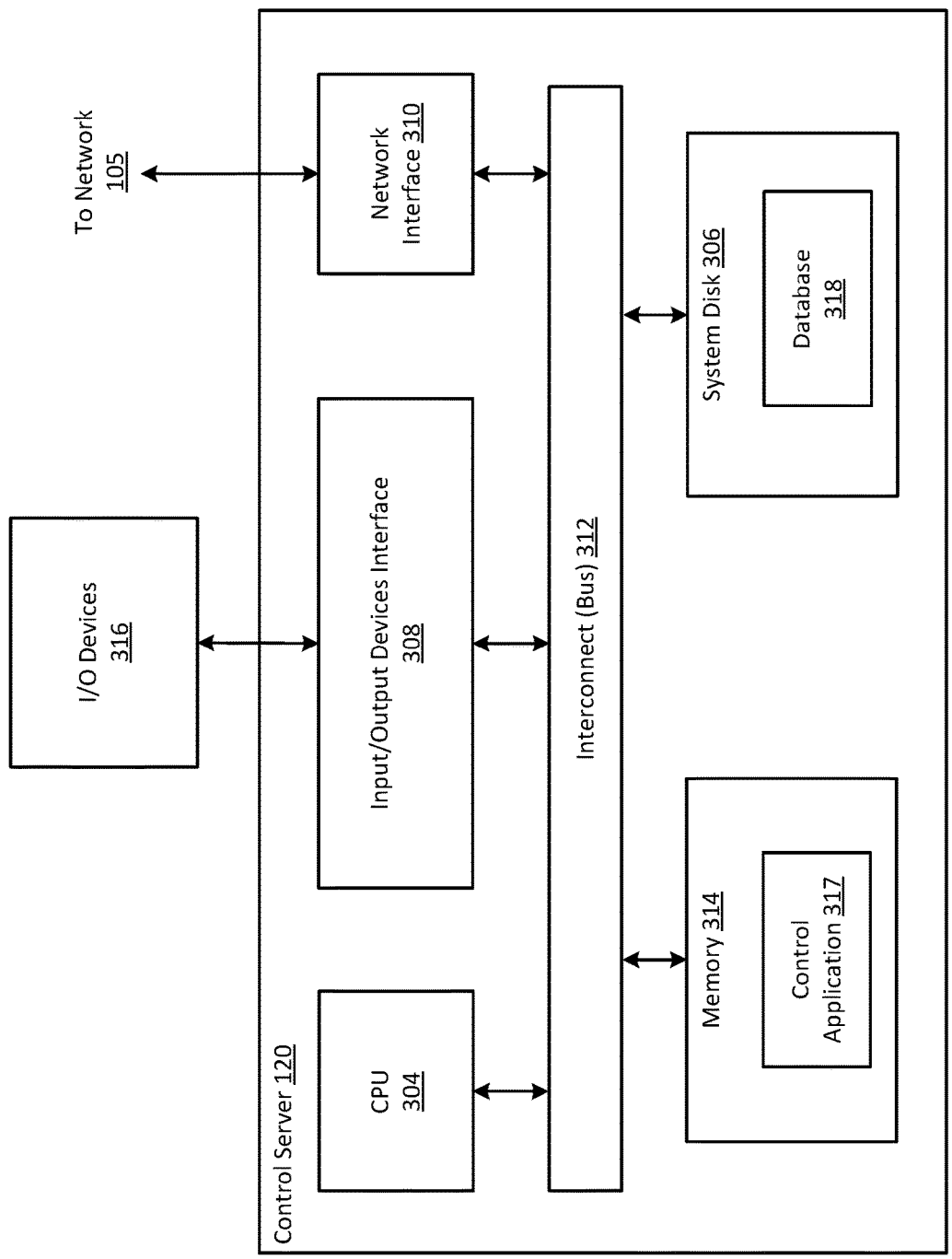
FIG. 3 is a more detailed illustration of the control server of FIG. 1, according to various embodiments of the present disclosure.

FIG. 3 is a more detailed illustration of control server 120 of FIG. 1, according to various embodiments of the present invention. As shown, control server 120 includes, without limitation, CPU 304, system disk 306, I/O device interface 308, network interface 310, interconnect 312, and system memory 314.

CPU 304 is configured to retrieve and execute programming instructions, such as control application 317, stored in system memory 314. Similarly, CPU 304 is configured to store application data (e.g., software libraries) and retrieve application data from system memory 314 and/or database 318 that is stored in system disk 306. Interconnect 312 is configured to facilitate transmission of data between CPU 304, system disk 306, I/O device interface 308, network interface 310, and system memory 314. I/O device interface 308 is configured to transmit input data and output data between the one or more I/O devices 316 and CPU 304 via interconnect 312. In various embodiments, system disk 306 may include one or more hard disk drives, solid state storage devices, etc. In various embodiments, system disk 206 (shown in FIG. 2) is configured to store database 318 that stores information associated with one or more content servers 110, cloud services 130, and/or files 218.

System memory 314 includes control application 317 configured to access information stored in database 318 and process the information to determine the manner in which specific files 218 will be replicated across content servers 110 included in network infrastructure 100. Control application 317 may further be configured to receive and analyze performance characteristics associated with one or more content servers 110 and/or endpoint devices 115.

In various embodiments, control application 317 may further be configured to transmit one or more font patch files stored in database 318 to endpoint devices 115. For example, endpoint device 115 could send one or more update requests to control server 120 for each font patch file stored in database 318. Control application 317 could be configured to respond to the one or more update requests by identifying one or more font patch files stored in database 318 and sending the one or more font patch files to endpoint device 115. Additionally or alternatively, control application 317 may be configured to transmit one or more font patch files without receiving a request from endpoint device 115. For example, control application 317 could be configured to periodically send one or more font patch files to each endpoint device 115 included in network infrastructure 100.

Figure 4:
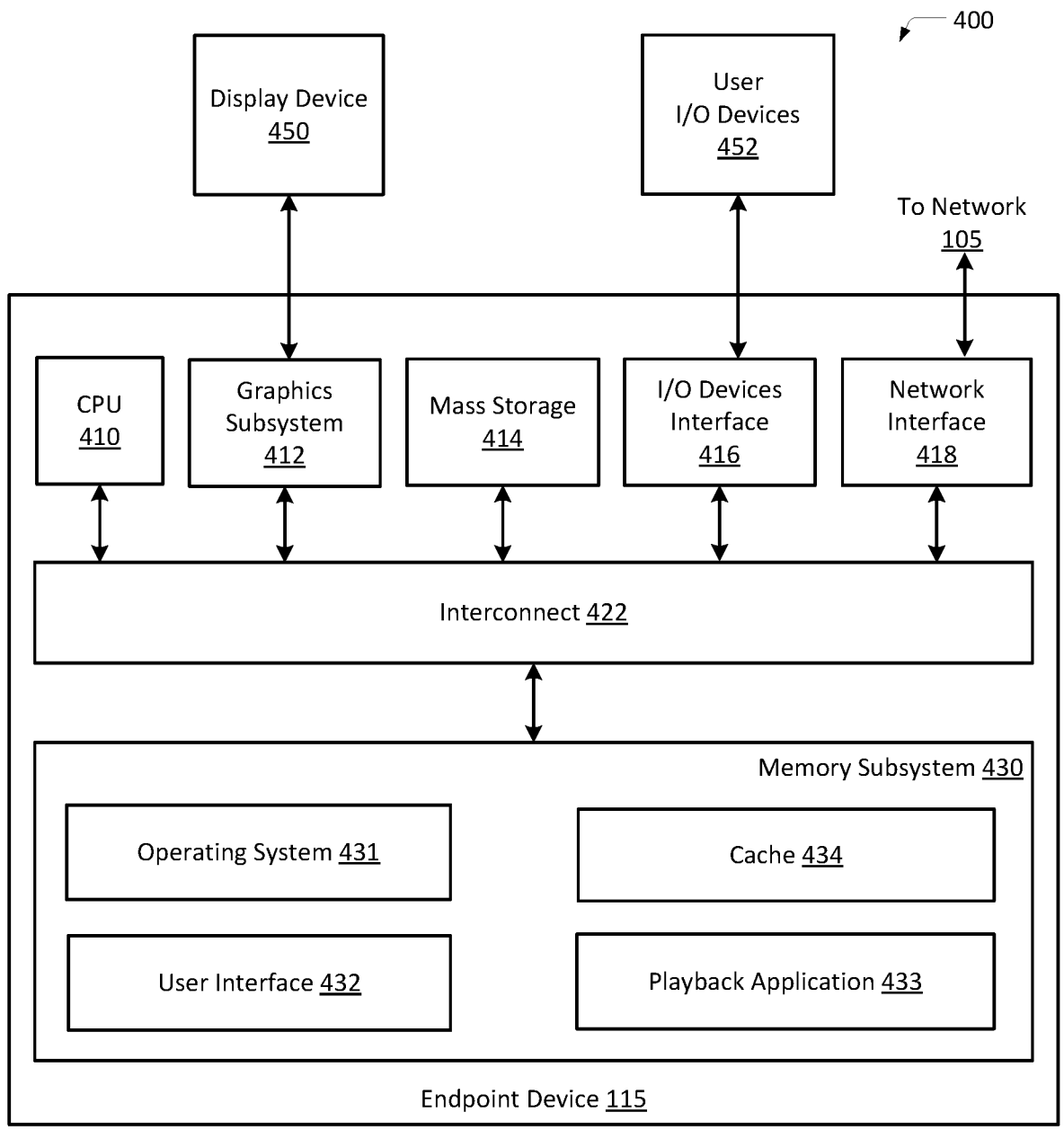
FIG. 4 is a more detailed illustration of the endpoint device of FIG. 1, according to various embodiments of the present disclosure.

FIG. 4 is a more detailed illustration of endpoint device 115 of FIG. 1, according to various embodiments of the present invention. As shown, endpoint device 400 may include, without limitation, CPU 410, graphics subsystem 412, mass storage unit 414, I/O device interface 416, network interface 418, interconnect 422, memory subsystem 430, display device 450, and user I/O devices 452.

In some embodiments, CPU 410 is configured to retrieve and execute programming instructions stored in memory subsystem 430. Similarly, CPU 410 is configured to store and retrieve application data (e.g., software libraries) residing in the memory subsystem 430. Additionally or alternatively, CPU 410 is configured to store and retrieve data, including content items and/or application data, from mass storage unit 414. Interconnect 422 is configured to facilitate transmission of data, such as programming instructions and application data, between the CPU 410, graphics subsystem 412, mass storage unit 414, I/O devices interface 416, network interface 418, and memory subsystem 430.

Graphics subsystem 412 is configured to generate frames of video data and transmit the frames of video data to display device 450. In various embodiments, graphics subsystem 412 may be integrated, along with CPU 410, into an integrated circuit (IC). Display device 450 may comprise any technically-feasible means for generating an image for display. For example, display device 450 could be fabricated using liquid crystal display (LCD) technology, cathode-ray tube technology, and/or light-emitting diode (LED) display technology. In various embodiments, display device 450 may display one or more graphical user interfaces (GUIs).

Mass storage unit 414 can include, for example, a hard disk drive and/or flash-memory storage drive, and is configured to store nonvolatile data. For example, mass storage unit 414 could store one or more files 218, such as content items and/or application data. In various embodiments, endpoint device 115 may copy one or more files 218 stored in memory subsystem 430 (e.g., secure application data) to mass storage unit 414.

Input/output (I/O) device interface 416 is configured to receive input data from user one or more I/O devices 452 and transmit the input data to CPU 410 via interconnect 422. For example, user I/O device 452 may comprise one of more buttons, a keyboard, and a mouse or other pointing device. In various embodiments, I/O device interface 416 also includes an audio output unit configured to generate an electrical audio output signal. In such instances, user I/O device 452 may include an audio output device, such as headphones and/or a loudspeaker, configured to generate an acoustic output in response to the electrical audio input signal. Additionally or alternatively, display device 450 may include the loudspeaker. Examples of suitable devices known in the art that can display video frames and generate an acoustic output include televisions, smartphones, smartwatches, electronic tablets, etc.

Network interface 418 is configured to transmit and receive packets of data via network 105. In some embodiments, network interface 418 is configured to communicate using at least one of the Ethernet standard, the Bluetooth standard, and/or one or more wireless communication standards. Network interface 418 is coupled to CPU 410 via interconnect 422.

Memory subsystem 430 includes various portions of memory, programming instructions, and/or application data. In various embodiments, memory subsystem may include operating system 431, user interface 432, playback application 433, and cache 434.

Operating system 431 performs system management functions, such as managing hardware devices including graphics subsystem 412, mass storage unit 414, I/O device interface 416, and network interface 418. Operating system 431 also provides process and memory management models for user interface 432, playback application 433, and cache 434. For example, endpoint device 115 may execute operating system 431 to write data to cache 434 and/or sync data included in cache 434 to mass storage unit 414.

User interface (UI) 432 may be, for example, a graphical user interface (GUI) employing a window-and-object metaphor, provides a mechanism for user interaction with endpoint device 115. Persons skilled in the art will recognize the various operating systems 431 and/or user interfaces 432 that are suitable for incorporation into endpoint device 115. In various embodiments, user interface 432 may present various files in a file system, including one or more objects stored in cloud services 130 and mounted as one or more files. In some embodiments, endpoint device 115 may execute a headless configuration that does not include UI 432.

Playback application 433 performs various playback functions associated with content items, such as displaying a GUI for content item selection and video playback of specific multimedia content items. The GUI employs a window-and-object metaphor to provide a mechanism for user interaction with endpoint device 115. Persons skilled in the art will recognize various operating systems and/or user interfaces that are suitable for incorporation into playback application 433. Playback application 433 is configured to request and/or receive content (e.g., one or more files 218) from content server 110 via network interface 418. Further, playback application 433 is configured to interpret the content and present the content via display device 450 and/or user I/O devices 452.

Cache 434 is a portion of volatile memory that stores files 218, such as content items, portions of retrieved objects, and/or application data (e.g., secure application data, metadata, etc.). In various embodiments, cache 434 may correspond to a section of nonvolatile memory. In some embodiments, endpoint device 115 may sync data between cache 434 and mass storage unit 414 so that copies of data are stored in both cache 434 and mass storage unit 414.

Dynamic File Interface to Control Access to Remote Files

Figure 5:
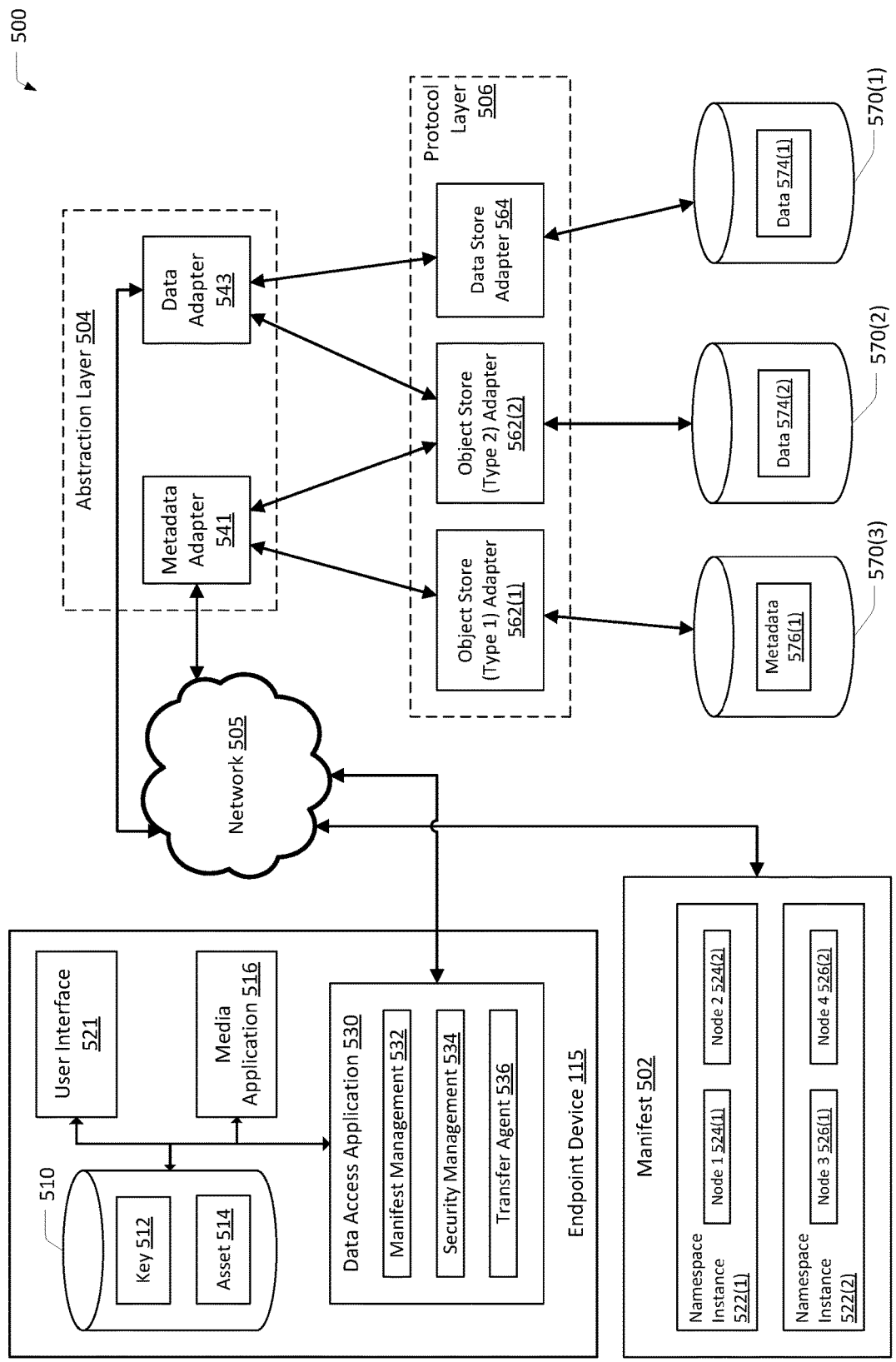
FIG. 5 illustrates a version of the network infrastructure of FIG. 1, according to various embodiments of the present disclosure.

FIG. 5 illustrates a version of the network infrastructure of FIG. 1, according to various embodiments of the present disclosure. As shown, network infrastructure 500 includes endpoint device 115, network 505, manifest 502, abstraction layer 504, protocol layer 506, and endpoint devices 570. Endpoint device includes local data store 510, media application 516, and data access application 530. Manifest 502 includes one or more namespace instances 522, which include nodes 524, 526. Abstraction layer 504 includes metadata adapter 541 and data adapter 543. Protocol layer 506 includes one or more object store adapters 562 and/or one or more data store adapters 564. Endpoint stores 570 include data 574 and/or metadata 576.

For explanatory purposes, multiple instances of like objects are denoted with reference numbers identifying the object and additional numbers identifying the instance where needed. Further, network infrastructure 500 includes multiple instances of devices, even when not shown. For example, network infrastructure 500 could include multiple media applications 516 (e.g., 516(1), 516(2), etc.) and/or endpoint devices 115 (e.g., 115(1), 115(2), etc.) and still be within the scope of the disclosed embodiments.

In operation, data access application (DAA) 530 provides a user with a user namespace that is accessible by user interface 521 and/or one or more media applications 516. The user namespace includes a set of assets that are accessible to the user. Each asset is stored within the distributed network infrastructure 500 in various locations. For example, an asset has data 574 and corresponding metadata 576 stored separately in one or more endpoint stores 570. In order to provide the user namespace, DAA 530 retrieves manifest 502 that is associated with the user operating endpoint device 115. In various embodiments, there are various ways to dynamically build a username space. For example, three ways to dynamically build the user namespace include (1) manifest 502, (2) a REST API, or (3) a control place interaction with a cloud service.

Manifest 502 specifies the contents of one or more namespace instances 522, which includes nodes 524, 526 that are accessible by the user. Manifest 502 also specifies the endpoint stores 570 storing the data and metadata portions of the nodes 524, 526. Each node 524, 526 is associated with a specific asset 514 and includes a unique node identifier (UNID) and a relative path for the node within the user namespace. Manifest 502 is continually updated to reflect the assets to which a user is granted access. In various embodiments, a user may use a tool that causes manifest management module 532 to update namespace instance 522 and/or specific nodes 524, 526 that are accessible in the user namespace.

When user interface 521 and/or media application 516 requests an asset 514 corresponding to a specific node within the user namespace (e.g., node 1 524(1)), DAA 530 sends requests to the specific endpoint nodes 570 responsible for storing the data and metadata associated with the asset. DAA 530 sends one or more requests through the network to separate adapters (e.g., metadata adapter 541 and data adapter 543) in abstraction layer 504 to retrieve the respective data and metadata. Each adapter 541, 543 routes the requests through specific storage-type adapters (e.g., object store adapters 562, data store adapters 564) to retrieve the requested data and metadata. Each endpoint store 570 locates the specific data and metadata associated with the asset (e.g., data 574(2), metadata 576(1)) and transfers the respective data or metadata to endpoint device 115 via DAA 530. DAA 530 locally stores data 574(2) and metadata 576(1) in local data store 510 and presents asset 514 for use by media application 516. When the user makes updates to asset 514, DAA 530 causes endpoint device 115 to send the updated data 574(2) and updated metadata 576(1) to the respective endpoint stores 570.

Data access application (DAA) 530 manages the access and processing of data retrieved from both local storage (e.g., local data store 510) and remote storage (e.g., endpoint stores 570). In various embodiments, DAA 530 includes one or more of manifest management module 532, security management module 534, and/or transfer agent 536.

DAA 530 identifies the user that is operating endpoint device 115 and provides a user-specific namespace (herein "user namespace") associated with the identified user. In various embodiments, endpoint device 115 may receive a manifest 502 that is associated with the identified user. In such instances, DAA 530 may execute manifest management application 532 in order to process manifest 502 and configure a user namespace (not shown) that includes a set of assets that are accessible by the user. DAA 530 may generate the user namespace and provide the user namespace as a portion of the file system of endpoint device 115. For example, DAA 530 may provide the user namespace as a distinct drive or folder within the file system provided via user interface 521. Additionally or alternatively, DAA 530 may provide the user namespace to media application 516. In such instances, a user may navigate through the user namespace as a portion of the file system (e.g., navigating to open a file).

In various embodiments, the set of assets accessible to the user is a subset of assets stored within the storage system. For example, a system administrator or service within network infrastructure (e.g., a workflow manager) could grant the user permission to access a subset of assets. In such instances, DAA 530 could identify the subset of assets as identified in the manifest 502 for the user in order to generate the user namespace that includes the subset of assets.

In some embodiments DAA 530 processes objects stored in one or more cloud stores (e.g., endpoint stores 570(2), 570(3) via object store adapters 562(1), 562(2). In various embodiments, DAA 530 may cause endpoint device 115 retrieve data 574(2) and/or metadata 576(1) as an object and mount the object as a file or a portion of a file in the file system of user interface 521. For example, endpoint device 115 could include a Portable Operating System Interface (POSIX)-compliant file system. In such instances, DAA 530 could translate objects retrieved from object stores 570(2), 570(3) such that is a file within the user namespace.

Manifest management module 532 processes and/or writes to manifest 502. In various embodiments, DAA 530 executes manifest management module 532 to retrieve manifest 502 during startup to configure the user namespace. In various embodiments, manifest management module 532 may process the contents of manifest 502 in order to configure the user namespace. For example, manifest management module 532 could identify one or namespace instances 522 (e.g., namespace instance 522(1), 522(2) included in manifest 502 and could generate the user namespace to include each namespace instance 522.

In some embodiments, manifest management module 532 may periodically process manifest 502 and/or be explicitly instructed to affect one or more changes to determine whether the contents of manifest 502 has changed. In such instances, DAA 530 may execute manifest management module 532 to dynamically update the user namespace to reflect the changes made in manifest 502. Additionally or alternatively, manifest management module 532 may modify the contents of manifest 502 when the user or system administrator has the applicable credentials to modify manifest 502. For example, a user or other system administrator could execute a control interface via manifest management module to add, remove, and/or edit details of a node within a particular namespace instance 522.

Security management module 534 enables secure transfer of content items between devices. In some embodiments, security management module 534 may respond to verification requests and/or transfer requests by providing security credentials, such as security key 512 associated with the user. Additionally or alternatively, security management module may provide authorization tokens and/or other security credential or identity information to requesting devices. For example, security management module 534 could include security key 512 in request messages to retrieve data 574 and/or metadata 576 from endpoint stores 570. In such instances, the endpoint store 570 or remote storage service could verify the security key before transferring the data 574 and/or metadata 576. In some embodiments, security management module 534 may sign one or more messages using security key 512 to send secure messages via network 505. In some embodiments, security management module 534 may, upon receipt of a token and/or, distribute the token and/or key to one or more endpoint stores 570 in order to encrypt the data 574 and/or metadata 576 and enable secure transfer of the encrypted data 574 and/or metadata 576.

Transfer agent 536 manages transfers of data 574 and/or metadata 576 between endpoint device 115 and other locations, including endpoint stores 570. In various embodiments, transfer agent 536 may include a download transfer agent and a separate upload transfer agent.

In various embodiments, transfer agent 536 receives information about the location of specific data 574 and/or metadata 576 from manifest management module 532. Based on the received information, transfer agent 536 connects to the applicable location (e.g., endpoint store 570(1)) and transfers the specific data 574 and/or metadata 576 between the remote location and local data store 510.

In various embodiments, transfer agent 536 may optimize transfers between storage from or to a particular endpoint store 570 and/or local data store 510 by selecting a specific transfer method. For example, transfer 536 may execute UDP-based transfers to endpoint store 570(2). For example, transfer agent 536 could warm cache asset 514 based on manifest 502 such that asset 514 is stored in local data store 510 by a specified time, before a user requests access to asset 514.

Local data store 510 acts as a container to store data. In various embodiments, local data store 510 may securely store assets 514 as files. Additionally or alternatively, local data store 510 may store other items, such as security credentials (e.g., security key 512) or objects obtained from object storage.

Asset 514 is a file, such as a content item that includes asset data, asset metadata, and/or other data associated with the digital asset. In some embodiments, asset 514 may be a portion of a larger content item or digital media asset. For example, an audiovisual file could be split and converted into multiple objects. Each object could be distinct asset with a separate identifier (e.g., one asset comprising a clip of a discrete portion of the audiovisual file). In another example, the audiovisual file could be split into objects representing separate components, such as separate audio asset(s), subtitle asset(s), visual asset(s), etc.

Media application 516 is an application that accesses asset 514 during execution. For example, media application 516 could access asset 514 in order to enable a user to complete a task in a production workflow. In various embodiments, media application 516 includes various tools and functions that enable a user to perform specific tasks within media application 516. For example, media application 516 could be an instance of a three-dimensional (3D) design application that is implemented by endpoint device 115. In various embodiments, media application 516 could be one of several types of software products, such as coding environments, encoding environments, graphics design applications, word processing applications, entertainment applications (e.g., content playback applications, games, etc.), and so forth.

User interface (UI) 521 may be, for example, a graphical user interface (GUI) employing a window-and-object metaphor, provides a mechanism for user interaction with endpoint device 115. In various embodiments, user interface 521 enables interaction with the operating system of endpoint device 115. The operating system performs system management functions for endpoint device 115, such as managing hardware devices and providing process and memory management models for user interface 521. Persons skilled in the art will recognize the various operating systems and/or user interfaces 521 that are suitable for incorporation into endpoint device 115. In various embodiments, user interface 521 may present various files in a file system, including one or more objects mounted as one or more files. In some embodiments, endpoint device 115 may execute a headless configuration that does not include UI 521.

Manifest 502 specifies the contents that are to be included in a user namespace. In various embodiments, manifest 502 specifies information for one or more namespace instances 522 (e.g., 522(1), 522(2)) that constitute the user namespace. A given namespace instance 522 (e.g., namespace instance 522(1)) combines the data associated with an asset (e.g., data 574(1)) with metadata associated with the asset (e.g., metadata 576(1)). In some embodiments, manifest 502 includes security information and/or identification information, such as the certification path for security key 512 that is associated with the user. In some embodiments, namespace instance 522 may be associated with a group of users, such as a common workspace. In such instances, the security information may include security keys that are common to the group.

Namespace instance 522 also includes nodes 524, 526 that are accessible by the user. Manifest 502 also specifies, for a given namespace instance 522, the endpoint stores 570 storing the data and metadata portions of the nodes 524, 526. For example, manifest 502 could specify that endpoint store 570(1) stores data for nodes 524(1), 524(2), and endpoint store 570(3) stores metadata for nodes 524(1), 524(2). Each node 524, 526 is associated with a specific asset 514 and includes a unique node identifier (UNID) and a relative path for the node within the user namespace. For example, node 526(1) could be associated with a photo asset 514 could include a UNID of 1234-0002 and a relative file path of "/Photos/tree.jpg." In such instances, DAA 530 may configure the user namespace to include photo asset 514 as a JPEG file in the "Photos" folder.

Manifest 502 is continually updated to reflect the assets to which a user is granted access. In various embodiments, a user may use a tool that causes manifest management module 532 to update namespace instance 522 and/or specific nodes 524, 526 that are accessible in the user namespace. For example, manifest 502 could be updated via a REST API and/or a control plane interface between endpoint device 115 and a service that is managing manifest 502. In some embodiments, namespace instance 522 may be directly updated via the REST API and/or the control plane interface in lieu of updating manifest 502.

In various embodiments, manifest 502 may specify a subset of nodes that are accessible to the user. For example, a workflow management service, media orchestrator, or other device in distributed network 500 could analyze data associated with one or more workflows (e.g., workflow pipeline, individual tasks, authorized users, etc.), and/or information that is associated with assets stored in the endpoint stores 570. Based on analysis of such information, the workflow manager may generate and/or update manifest 502 to list within a given namespace instance 522(1) a subset of nodes (e.g., 524(1), 524(2)) that are currently accessible to the user.

In one example, a media orchestrator could receive information from one or more media workflows. Such information may be associated with one or more production workflows of various types. Such production workflow types may include, for example, production tasks that are to be performed by one or more users in relation to assets stored within network infrastructure 500. In various embodiments, a given media workflow may include one or more entries that map tasks in a production workflow to information associated with the tasks, such as location, users, costs, time period for performance, and so forth. For example, a media workflow may be a production workflow that includes entries associated with various production tasks that are performed by one or more users. For a given production task, the media workflow may include an entry that specifies the asset 514 as necessary for the user operating endpoint 115 to perform the production task, as well as information about the user assigned to perform a task (e.g., username, security path for key 512, etc.).

Abstraction layer 504 is an interface that defines methods to handle various transfers of data and metadata. In various embodiments, abstraction layer 504 may include separate metadata adapter 541 and data adapter 543 that separate handle calls associated with transfers of objects or files, respectively. In some embodiments, metadata adapter 541 and/or data adapter 543 may be updated to handle new file formats and/or object formats associated with data or metadata without requiring updates to DAA 530. For example, metadata adapter 541 and/or data adapter 543 could provide representational state transfer (REST) application program interface (API) and/or a gRMC Remote Procedure Call (gRPC) interface to invoke methods to read, write, or manipulate a given data or metadata object.

Protocol Layer 506 is a separate interface layer that defines methods to handle various transfers of data and metadata with specific types of endpoint stores 570 and/or distributed storage services. In various embodiments, protocol layer 506 may include separate types of object store adapters 562 (e.g., object store type 1 adapter 562(1), object store type 2 adapter 562(2), etc.) and one or more data store adapters 564 that separate handle calls associated with transfers of objects or files, respectively. In some embodiments, the particular adapters included in protocol layer 506 handle various mechanisms not handled by the metadata adapter 541 and data adapter 543, such as error handling and retry mechanisms.

Endpoint stores 570 (e.g., 570(1), 570(2), 570(3), etc.) include various data stores and/or object stores. In various embodiments, one or more of endpoint stores 570 may be instances of an object storage services (OSS) such as a web server, that stores data from a plurality of sources. In various embodiments, endpoint store 570 may be an online storage service (e.g., Amazon® Simple Storage Service (S3), Google® Cloud Storage, etc.) in which a catalog of thousands or millions of files and/or objects is stored and/or accessed. In some embodiments, endpoint store 570 also may provide computing and/or other processing services. In some embodiments endpoint store 570 may be a data store that stores data and/or metadata as a plurality of files. In various embodiments, any number of endpoint stores 570 (e.g., 570(1) to 570(N)) may be included in network infrastructure 500.

Figure 6:
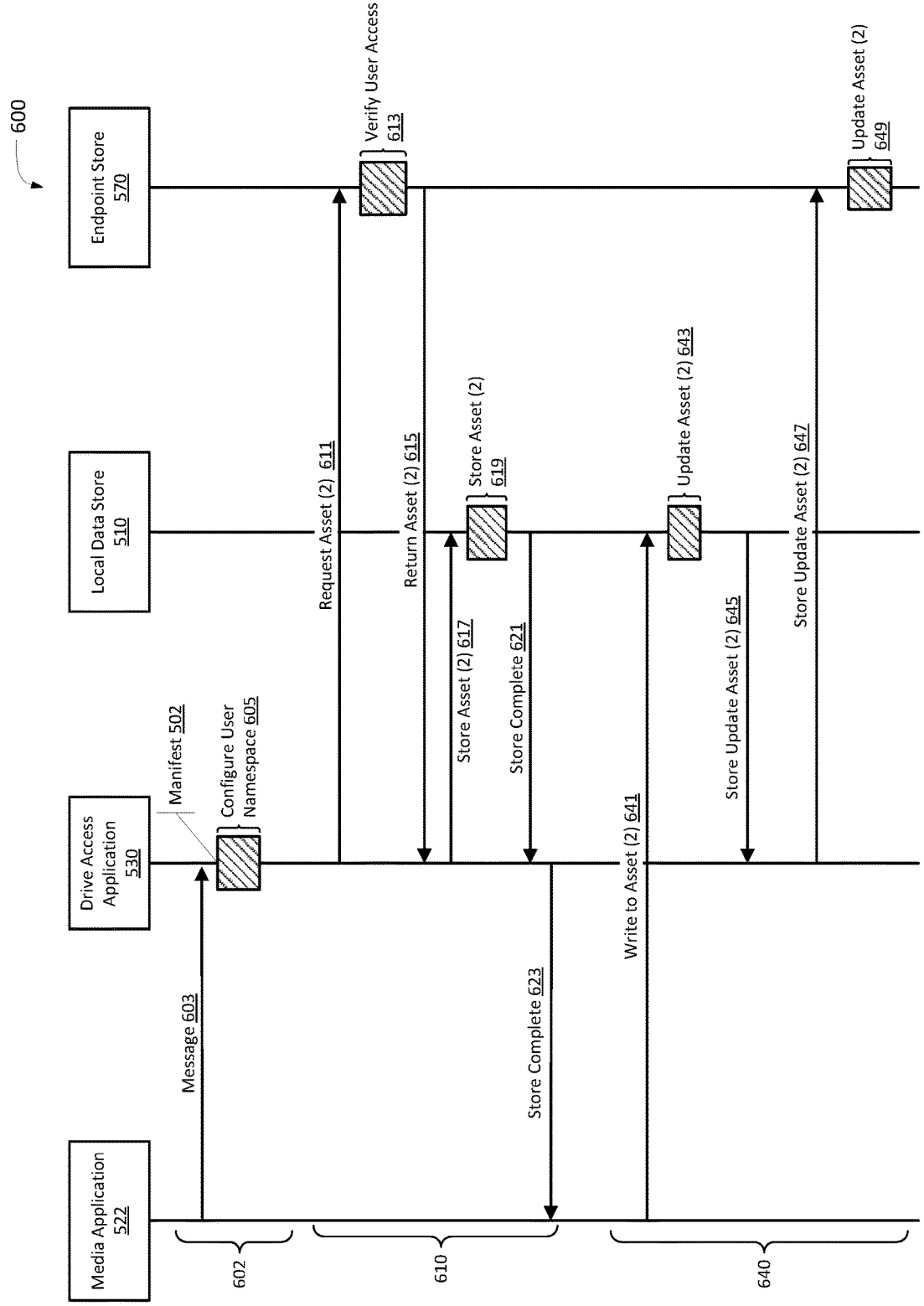
FIG. 6 illustrates a call flow diagram showing interactions between various components of the example network infrastructure of FIG. 5, according to various embodiments of the present disclosure.

FIG. 6 illustrates a call flow diagram 600 showing interactions between various components of the example network infrastructure 500 of FIG. 5, according to various embodiments of the present disclosure. One or more components of network infrastructure 500 may perform various operations to retrieve, read, write, and update assets 514 associated with nodes 524, 526 that are accessible to a user.

During the configure namespace sequence 602, media application 516 sends message 603 to data access application (DAA) 530 to configure a user namespace associated with the user operating endpoint device 115. For example, a user could navigate user interface 521 to a folder or drive in that corresponds to the user namespace. In such instances, user interface 521 could generate message 603 to DAA 530 to provide the user namespace. Additionally or alternatively, a user could operate media application 516 as part of an associated project workflow. Media application 516 could respond to a user action by generating message 603 that requests the user namespace.

DAA 530 performs actions 605 to configure the user namespace. In various embodiments, manifest management module 532 included in DAA 530 may respond to message 603 by referring to one or more namespace instances 522 included in manifest 502 and may generate the user namespace to include each namespace instance 522. In various embodiments, DAA 530 may present the user namespace as a file-and-folders user interface. In some embodiments, manifest management module 532 may pre-load the user namespace. For example, manifest management module 532 may configure the user namespace after the user performs a login to endpoint device 115. In such instances, manifest management module 532 may respond to message 603 by determining whether manifest 502 includes any updates and applies any updates included in manifest 502 to the user namespace.

As an example, DAA 530 could perform actions to configure the user namespace to include Asset (1) and Asset (2) as files available within the user namespace for access by media application 516 via DAA 530. In some embodiments, DAA 530 may perform read asset operations 602 to retrieve a specific asset (e.g., Asset (1)) for access by user interface 521 and/or media application 516. Additionally or alternatively, a user or other system administrator may dynamically via DAA 530 add an asset (e.g., Asset (3)) to the user namespace, edit assets (e.g., Asset (2)), and/or remove an asset from the user namespace. In such instances, manifest management module 532 included in DAA 530 may modify the contents of manifest 502 when the user or system administrator has the applicable credentials to modify manifest 502.

During the read asset sequence 610, DAA 530 sends message 611 requesting an asset (e.g., Asset (1)) from one or more endpoint stores 570. For example, DAA 530 could initially configure the user namespace such that the user interface includes node 524(1) that corresponds to Asset (1) and node 526(1) that corresponds to Asset (2). A user could cause media application 516 to send message 611 requesting access Asset (1) (corresponding to node 524(1)). DAA 530 may determine that the user submitted a request to access a particular asset corresponding to a node 524(1) (e.g., Asset (1)). In some embodiments, upon determining that the user requested Asset (1), manifest management application 532 included in DAA 530 may retrieve the unique node identifier (UNID) for node 524(1), as specified in manifest 502, and identifiers for the endpoint stores 570 (e.g., endpoint stores 570(1), 570(3)) that are storing the data 574(1) and metadata 576(1) corresponding to node 524(1). DAA 530 sends one or more messages 611 to the identified endpoint stores 570 via adapters 541, 543 in abstraction layer 504 and adapters 562, 564 in protocol layer 506. In some embodiments, manifest management module 532 may cache information included in manifest 502. In such instances, DAA 530 may referred to the cached information to retrieve assets in lieu of referring to manifest 502 each time.

Each identified endpoint store 570 performs one or more actions 613 to verify that the user has been granted access to the asset. In various embodiments, message 611 includes one or more security credentials for the user, such as security key 512. In such instances, endpoint store 570 may use the security credentials to authenticate and authorize access to particular portions of the contents that endpoint device 570 stores. For example, a particular workflow could indicate that a user has temporary read/write/delete permissions to a specific asset. In such instances, an access control list for the specific asset could include the user's security credentials. Endpoint device 570 could then compare the security credentials of the user to the access control list to verify that the user is allowed to access the asset.

Endpoint store 570 sends message 615 that includes the applicable data and metadata associated with Asset (1) to DAA 530. For example, endpoint store 570(1) could be an object store that stores data 574(1) that is associated with Asset (1). In such instances, endpoint store 570(1) could send a message 615 that includes the data 574(1) to DAA 530. Additionally or alternatively, DAA 530 may receive multiple messages 615 from multiple endpoint stores 570 that are storing the respective data and metadata associated with Asset (1).

DAA 530 sends message 617 to local data store 510 to store Asset (1). In various embodiments, DAA 530 may receive one or more of the data 574 and/or metadata 576 that combine to constitute Asset (1). In such instances, DAA 530 may send one or more messages 617 that include the data 574 and/or metadata 576 to local data store 510 such that local data store 510 performs one or more operations 619 to store Asset (1). In some embodiments, DAA 530 may translate data and/or metadata from an object to a file that can be proceeded by media application 516. For example, endpoint store 570(2) could be an object storage service (OSS) that stores data 574(2) as an object. In such instances, DAA 530 may translate data 574(2) as a file and store the file in local data store 510.

Once local data store 510 stores Asset (1), local data store 510 sends message 621 to DAA 530 indicating that the storage of Asset (1) is complete. In various embodiments, DAA 530 may then send message 623 to media application 516 indicating that storage of Asset (1) in local data store 510 is complete. In such instances, media application 516 may access Asset (1) as a file stored in local data store 510.

During the write process 640, media application 516 sends one or more messages 641 to local data store 510 to perform writes to the locally-stored Asset (1). For example, a user operating media application 516 could perform various edits to an Asset (1) and save changes as writes to a locally-stored file. When the user performs each edit, media application 516 could send a separate message 641 to local data store 510 in order to perform a write operation on Asset (1). In such instances, local data store 510 could respond to each message 641 by performing one or more operations 643 to update Asset (1).

In various embodiments, a user may confirm that the updated Asset (1) is to be published and/or that a global copy of Asset (1) is to be updated. In such instances, local data store 510 may respond by sending message 645 to DAA 530 indicating that the updated Asset (1) is to be stored in the applicable endpoint stores 570 that are storing the data and metadata associated with the asset. DAA 530 responds by sending one or more messages 647 to the applicable endpoint stores 570 to store the updated data and metadata associated with Asset (1) included in message 647. Each endpoint store 570 may respond to message 647 by performing one or more actions 649 to store the updated data and metadata. In various embodiments, each endpoint store 570 may overwrite the existing data and/or metadata associated with Asset (1) with the updated data and/or metadata received in message 647.

Figure 7:
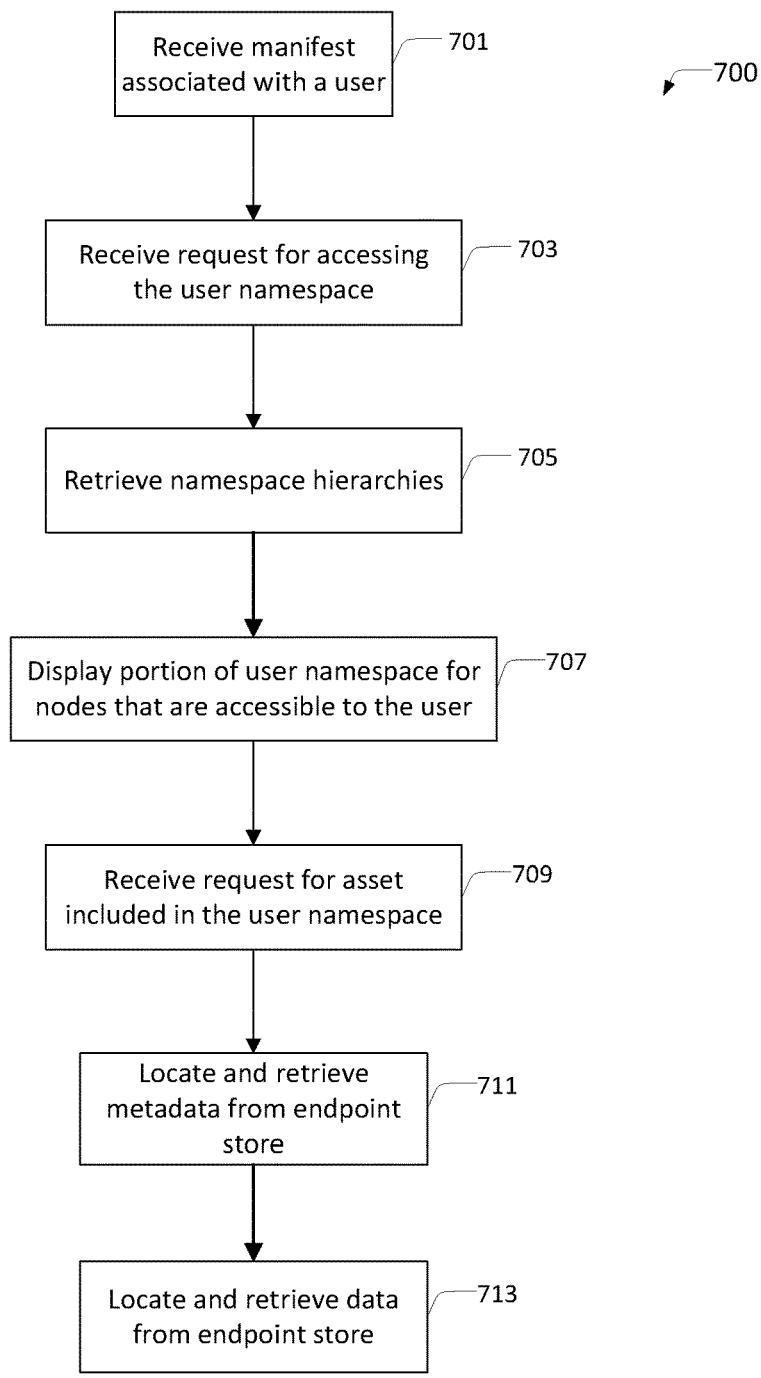
FIG. 7 sets forth a flow diagram of method steps for accessing an instance associated with multiple endpoint stores of FIG. 5, according to various embodiments of the present disclosure.

FIG. 7 sets forth a flow diagram of method steps for accessing an instance associated with multiple endpoint stores 570 of FIG. 5, according to various embodiments of the present disclosure. Although the method steps are described with reference to the systems and call flows of FIGS. 1-6, persons skilled in the art will understand that any system configured to implement the method steps, in any order, falls within the scope of the present disclosure.

Method 700 begins at step 701, data access application (DAA) 530 receives a manifest 502 that is associated with a user operating endpoint device 115. In various embodiments, manifest management module 532 included in DAA 530 may configure a user namespace corresponding to a user operating endpoint device 115. In some embodiments, the user may login to an endpoint device by providing credentials, such as a username and/or a security key 512. In such instances, manifest management module 532 and/or security management module 532 may retrieve manifest 502 corresponding to the user. In some embodiments, endpoint device 115 may receive the applicable manifest 502 when the user initially logs into the operating system of endpoint device 115.

At step 703, DAA 530 receives a request for accessing the user namespace. In some embodiments, the user performs an action to view the user namespace in user interface 521 and/or media application 516 that generates a request to access the user namespace and sends the request to DAA 530. For example, the user may attempt to open a virtual drive that corresponds to the user namespace. In such instances, DAA 530 may receive a request from user interface 521 to view the user namespace. Additionally or alternatively, the user, through operation of media application 516, could attempt to access an asset (e.g., open a video for editing). In such instances, media application 516 may attempt to access the user namespace as a drive or folder within the file system of endpoint device 115. In order to access the user namespace, media application 516 may generate a request to access the user namespace.

At step 705, DAA 530 retrieves namespace hierarchies for one or more endpoint stores 570. In various embodiments, manifest management module 532 included in DAA 530 may refer to manifest 502 to determine the namespace hierarchies for each namespace instance 522. Manifest 502 specifies the contents of one or more namespace instances 522, which includes nodes 524, 526 that are accessible by the user and the relative file path for each node within the namespace instance. DAA 530 may then determine the namespace hierarchies for each namespace instance by processing each relative file path of each node.

At step 707, DAA 530 displays a user namespace for nodes 524, 526 that are accessible to the user. In various embodiments, DAA 530 may combine multiple namespace hierarchies to generate a single, overall namespace hierarchy for the user namespace. In such instances, DAA 530 may cause media application 516 and/or user interface 521 to display the user namespace as a folder or drive. In some embodiments, a user may navigate the user namespace by navigating through various folders to access particular assets corresponding to nodes 524, 526 as specified in manifest 502.

At step 709, DAA 530 receives a request for an asset 514 that is included in the user namespace. In some embodiments, DAA 530 may receive a request for asset 514 within the user namespace when the user navigates to asset 514 within user interface 521. Additionally or alternatively, a user may perform an action in media application 516 that causes media application 516 to request access asset 514. In such instances, media application 516 may send one or more messages to DAA 530 to request access to asset 514.

At step 711, DAA 530 locates and retrieves metadata 576 for asset 514 from an endpoint store 570. In various embodiments, manifest management module 532 may determine that the requested asset corresponds to node 524 in the user namespace. For example, asset 514 could include a unique node identifier (UNID) that is associated with one of the nodes (e.g., 524(1)) listed in manifest 502. In such instances, DAA 530 could refer to the namespace instance 522(1) portion of manifest 502 in order to identify the listed metadata store (e.g., endpoint store 570(3)) that is storing metadata 576(1), which is associated with asset 514.

Transfer agent 536 and/or security management module 534 of DAA 530 could then cause DAA 530 send a request to the identified endpoint store 570(3) via metadata adapter 543 and object store adapter 562(1) to access metadata 576(1). The request for metadata 576(1) could include security credentials (including security key 512) that endpoint store 570(3) checks to verify that the user has been granted access to metadata 576(1). Endpoint store 570(3) then sends a copy of metadata 576(1) to endpoint device 115, where transfer agent 536 causes metadata 576(1) to be stored in local data store 510.

At step 713, DAA 530 locates and retrieves data 574 for asset 514 from an endpoint store 570. In various embodiments, manifest management module 532 may determine that the requested asset corresponds to node 524 in the user namespace. For example, asset 514 could include a unique node identifier (UNID) that is associated with one of the nodes (e.g., 524(1)) listed in manifest 502. In such instances, DAA 530 could refer to the namespace instance 522(1) portion of manifest 502 in order to identify the listed data store (e.g., endpoint store 570(1)) that is storing data 574(1), which is associated with asset 514.

Transfer agent 536 and/or security management module 534 of DAA 530 could then cause DAA 530 to send a request to the identified endpoint store 570(1) via data adapter 543 and data store adapter 564 to access data 574(1). The request for data 574(1) could include security credentials (including security key 512) that endpoint store 570(1) checks to verify that the user has been granted access to data 574(1). Endpoint store 570(1) then sends a copy of data 574(1) to endpoint device 115, where transfer agent 536 causes data 574(1) to be stored in local data store 510.

In such instances, data and metadata associated with the asset (e.g., data 574(1) and metadata 576(1)) may be combined and stored in local data store 510 as asset 514. In such instances, one or more applications, including media application 516 and/or user interface 521 may access the asset as a file for various read/write operations.

In sum, a data access application included in an endpoint device receives a manifest that is associated with the user operating the endpoint device. The manifest specifies the contents and structure of the user namespace by including information for one or more namespace instances included in the user namespace. Each namespace instance includes one or more nodes that are accessible by the user. Each node is associated with a specific asset and includes a unique node identifier (UN ID) and a relative filepath for the node within the user namespace. The manifest also specifies the endpoint stores that store the data and metadata portions of the asset. The data access application configures the user namespace based on the manifest and provides symbols for each of identified assets in the user namespace. In various embodiments, each of the symbols for the identified assets are located in a portion of user namespace based on the relative filepath specified in the manifest.

When a user requests an asset corresponding to a specific node within the user namespace, the data access application determines one or more endpoint stores that are currently storing the data and metadata associated with the asset. The data access application then sends requests through the network to separate adapters included in an abstraction layer to retrieve the respective data and metadata associated with the asset. Each adapter in the abstraction layer routes the requests through specific storage-type adapters included in a protocol layer to retrieve the requested data and metadata portions from the identified endpoint store. The identified endpoint store locates the respective data or metadata and transfers the located data or metadata to the endpoint device. The data access application stores the data and metadata locally in the local data store, where the asset is accessible as a file to the user operating the endpoint device. When the user updates the asset, the data access application causes the updated data and metadata associated with the asset to be sent to the respective endpoint stores for storage.

At least one technological advantage of the disclosed techniques relative to the prior art is that the data access application efficiently controls access to assets within a distributed storage infrastructure. In particular, by having a data access application refer to a manifest that lists the accessible assets to the user, the user may be provided with a dynamic namespace that accurately reflects the portions of the storage system that the user is allowed to access without wasting resources mapping and displaying inaccessible portions of large storage systems.

Another technological advantage of the disclosed techniques is that the data access application enables an application to access assets that are stored in various formats that are not otherwise readable by the application. By translating assets from a variety of different formats into a local file accessible by applications running on the endpoint device, the data access application enables a device to provide access to a wide range of assets without requiring each application translate the format based on how the asset is stored within a distributed network infrastructure. These technical advantages provide one or more technological advancements over prior art approaches.

1. In various embodiments, a computer-implemented method for accessing data comprises determining a manifest associated with a given user of an application, where the manifest identifies, one or more assets that are accessible by the given user, for each of the one or more assets, one of a plurality of endpoint stores that stores data associated with the asset, and for each of the one or more assets, one of the plurality of endpoint stores that stores metadata associated with the asset, generating, based on the manifest, a user namespace that includes a unique reference for each of the one or more assets, and presenting the user namespace to the given user.

2. The computer-implemented method of clause 1, where generating the user namespace comprises determining, based on the manifest, a first namespace instance that is associated with a first set of assets in the one or more assets, and determining, based on the manifest, a second namespace instance that is associated with a second set of assets in the one or more assets.

3. The computer-implemented method of clause 1 or 2, where the first namespace instance identifies an endpoint store of a first type in the plurality of endpoint stores that stores at least one of data associated with the first set of assets, or metadata associated with the first set of assets, and the second namespace instance identifies an endpoint store of a second type in the plurality of endpoint stores that stores at least one of data associated with the second set of assets, or metadata associated with the second set of assets.

4. The computer-implemented method of any of clauses 1-3, further comprising receiving a request for unique reference included in the user namespace, wherein the unique reference is for a first asset of the one or more assets, sending a first request for first metadata to a first endpoint store of the plurality of endpoint stores that stores the first metadata associated with the first asset, receiving the first metadata from the first endpoint store, sending a second request for first data to a second endpoint store of the plurality of endpoint stores that stores the first data associated with the first asset, receiving the first data from the second endpoint store, and generating a file, corresponding to the first asset, that includes the first data and the first metadata.

5. The computer-implemented method of any of clauses 1-4, where the one or more assets includes a first object, one of the plurality of endpoint stores includes an object storage, and further comprising receiving, from the object storage, the first object, and translating the first object into a first file, wherein the unique reference is associated with the first file.

6. The computer-implemented method of any of clauses 1-5, further comprising determining that a write operation has been performed on the file to generate an update file that includes second data and second metadata, transmitting the second data to the first endpoint store, and transmitting second metadata to the second endpoint store.

7. The computer-implemented method of any of clauses 1-6, where the unique reference for each of the one or more assets provides a link to a locally-stored file for the asset in a local data store.

8. The computer-implemented method of any of clauses 1-7, where the metadata identifies, for each of the one or more assets, a unique identifier, and wherein the unique identifier is associated with the data associated with the asset, and the unique identifier is associated with the metadata associated with the asset.

9. The computer-implemented method of any of clauses 1-8, further comprising determining an update to the manifest, where an updated set of one or more assets that are accessible by the given user differs from the one or more assets accessible by the given user, and updating, based on the updated manifest, the user namespace to include unique references for each of the updated set of one or more assets.

10. The computer-implemented method of any of clauses 1-9, further comprising receiving a security credential associated with the given user, where determining the manifest comprises receiving the manifest based on the security credential.

11. In various embodiments, a computing system for accessing data comprises a memory storing a data access application, and a processor that is coupled to the memory and executes the data access application to determine a manifest associated with a given user of an application, where the manifest identifies one or more assets that are accessible by the given user, for each of the one or more assets, one of a plurality of endpoint stores that stores metadata associated with the asset, and for each of the one or more assets, one of the plurality of endpoint stores that stores data associated with the asset, generate, based on the manifest, a user namespace that includes a unique reference for each of the one or more assets, and present the user namespace to the given user.

12. The computing system of clause 11, where the processor further executes the data access application to receive a request for unique reference included in the user namespace, where the unique reference is for a first asset of the one or more assets, send a first request for first metadata to a first endpoint store of the plurality of endpoint stores that stores the first metadata associated with the first asset, receive the first metadata from the first endpoint store, send a second request for first data to a second endpoint store of the plurality of endpoint stores that stores the first data associated with the first asset, receive the first data from the second endpoint store, and generate a file, corresponding to the first asset, that includes the first data and the first metadata.

13. The computing system of clause 11 or 12, where the first request is sent to the first endpoint store via a metadata adapter in an abstraction layer, and wherein the second request is sent to the second endpoint store via a data adapter included in the abstraction layer.

14. The computing system of any of clauses 11-13, where first metadata associated with a first asset of the one or more assets is stored in a first endpoint store in the plurality of endpoint stores, and first data associated with the first asset is stored in the first endpoint store.

15. The computing system of any of clauses 11-14, the metadata identifies, for each of the one or more assets, a relative filepath for the asset, and wherein user namespace provides the unique reference for each of the one or more assets based on each of the relative filepaths.

16. The computing system of any of clauses 11-15, where a first endpoint store in the plurality of endpoint stores is an object store that stores objects, and a second endpoint store in the plurality of endpoint stores is a data store that stores files.

17. In various embodiments, one or more non-transitory computer-readable storage media include instructions that, when executed by one or more processors, cause the one or more processors to perform the steps of determining a manifest associated with a given user of an application, where the manifest identifies one or more assets that are accessible by the given user, for each of the one or more assets, one of a plurality of endpoint stores that stores data associated with the asset, and for each of the one or more assets, one of the plurality of endpoint stores that stores metadata associated with the asset, generating, based on the manifest, a user namespace that includes a unique reference for each of the one or more assets, and presenting the user namespace to the given user.

18. The one or more non-transitory computer-readable storage media of clause 17, further including instructions that, when executed by the one or more processors, cause the one or more processors to perform the steps of receiving a request for unique reference included in the user namespace, wherein the unique reference is for a first asset of the one or more assets, sending a first request for first metadata to a first endpoint store of the plurality of endpoint stores that stores the first metadata associated with the first asset, receiving the first metadata from the first endpoint store, sending a second request for first data to a second endpoint store of the plurality of endpoint stores that stores the first data associated with the first asset, receiving the first data from the second endpoint store, and generating a file, corresponding to the first asset, that includes the first data and the first metadata.

19. The one or more non-transitory computer-readable storage media of clause 17 or 18, further including instructions that, when executed by the one or more processors, cause the one or more processors to perform the steps of determining that a write operation has been performed on the file to generate an update file that includes second data and second metadata, transmitting the second metadata to the first endpoint store, and transmitting second data to the second endpoint store.

20. The one or more non-transitory computer-readable storage media of any of clauses 17-19, further including instructions that, when executed by the one or more processors, cause the one or more processors to perform the steps of determining an update to the manifest, wherein an updated set of one or more assets that are accessible by the given user differs from the one or more assets accessible by the given user, and updating, based on the updated manifest, the user namespace to include unique references for each of the updated set of one or more assets.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for accessing data, the method comprising:
    determining a manifest associated with a given user of an application, wherein the manifest identifies:
        one or more assets of a plurality of assets stored in distributed storage services of a distributed network, wherein the one or more assets of the plurality of assets are accessible by the given user, wherein at least one asset of the one or more assets comprises a portion of data associated with a content item;
        for each of the one or more assets, one of a plurality of endpoint stores that stores data associated with the asset; and
        for each of the one or more assets, one of the plurality of endpoint stores that stores metadata associated with the asset, wherein metadata associated with the at least one asset comprises a portion of metadata associated with the content item;
    configuring, based on the manifest, a user namespace associated with the given user that includes a unique reference for each of the one or more assets, wherein the manifest provides access to the given user to the one or more assets and filters out access to other assets from the plurality of assets; and
    presenting the user namespace to the given user via a user interface, wherein the user interface is configured to provide access to the one or more assets.

2. The computer-implemented method of claim 1, wherein configuring the user namespace comprises:
    determining, based on the manifest, a first namespace instance that is associated with a first set of assets in the one or more assets; and
    determining, based on the manifest, a second namespace instance that is associated with a second set of assets in the one or more assets.

3. The computer-implemented method of claim 2, wherein:
    the first namespace instance identifies an endpoint store of a first type in the plurality of endpoint stores that stores at least one of data associated with the first set of assets, or metadata associated with the first set of assets; and
    the second namespace instance identifies an endpoint store of a second type in the plurality of endpoint stores that stores at least one of data associated with the second set of assets, or metadata associated with the second set of assets.

4. The computer-implemented method of claim 1, further comprising:
    receiving a request for unique reference included in the user namespace, wherein the unique reference is for a first asset of the one or more assets;
    sending a first request for first metadata to a first endpoint store of the plurality of endpoint stores that stores the first metadata associated with the first asset;
    receiving the first metadata from the first endpoint store;
    sending a second request for first data to a second endpoint store of the plurality of endpoint stores that stores the first data associated with the first asset;
    receiving the first data from the second endpoint store; and
    generating a file, corresponding to the first asset, that includes the first data and the first metadata.

5. The computer-implemented method of claim 4, wherein the one or more assets includes a first object, one of the plurality of endpoint stores includes an object storage, and further comprising:

receiving, from the object storage, the first object; and
translating the first object into a first file, wherein the unique reference is associated with the first file.

6. The computer-implemented method of claim 4, further comprising:
determining that a write operation has been performed on the file to generate an update file that includes second data and second metadata;
transmitting the second data to the first endpoint store; and
transmitting second metadata to the second endpoint store.

7. The computer-implemented method of claim 1, wherein the unique reference for each of the one or more assets provides a link to a locally-stored file for the asset in a local data store.

8. The computer-implemented method of claim 1, wherein the metadata identifies, for each of the one or more assets, a unique identifier, and wherein the unique identifier is associated with the data associated with the asset, and the unique identifier is associated with the metadata associated with the asset.

9. The computer-implemented method of claim 1, further comprising:
determining an update to the manifest, wherein an updated set of one or more assets that are accessible by the given user differs from the one or more assets accessible by the given user; and
updating, based on the updated manifest, the user namespace to include unique references for each of the updated set of one or more assets.

10. The computer-implemented method of claim 1, further comprising receiving a security credential associated with the given user, wherein determining the manifest comprises receiving the manifest based on the security credential.

11. A computing system for accessing data, the computing system comprising:
a memory storing a data access application; and
a processor that is coupled to the memory and executes the data access application to:
determine a manifest associated with a given user of an application, wherein the manifest identifies:
one or more assets of a plurality of assets stored in distributed storage services of a distributed network, wherein the one or more assets of the plurality of assets are accessible by the given user, wherein at least one asset of the one or more assets comprises a portion of data associated with a content item;
for each of the one or more assets, one of a plurality of endpoint stores that stores metadata associated with the asset; and
for each of the one or more assets, one of the plurality of endpoint stores that stores data associated with the asset, wherein metadata associated with the at least one asset comprises a portion of metadata associated with the content item;
configure, based on the manifest, a user namespace associated with the given user that includes a unique reference for each of the one or more assets, wherein the manifest provides access to the given user to the one or more assets and filters out access to other assets from the plurality of assets; and
present the user namespace to the given user via a user interface, wherein the user interface is configured to provide access to the one or more assets.

12. The computing system of claim 11, wherein the processor further executes the data access application to:
receive a request for unique reference included in the user namespace, wherein the unique reference is for a first asset of the one or more assets;
send a first request for first metadata to a first endpoint store of the plurality of endpoint stores that stores the first metadata associated with the first asset;
receive the first metadata from the first endpoint store;
send a second request for first data to a second endpoint store of the plurality of endpoint stores that stores the first data associated with the first asset;
receive the first data from the second endpoint store; and
generate a file, corresponding to the first asset, that includes the first data and the first metadata.

13. The computing system of claim 12, wherein the first request is sent to the first endpoint store via a metadata adapter in an abstraction layer, and wherein the second request is sent to the second endpoint store via a data adapter included in the abstraction layer.

14. The computing system of claim 11, wherein:
first metadata associated with a first asset of the one or more assets is stored in a first endpoint store in the plurality of endpoint stores, and
first data associated with the first asset is stored in the first endpoint store.

15. The computing system of claim 11, the metadata identifies, for each of the one or more assets, a relative filepath for the asset, and wherein user namespace provides the unique reference for each of the one or more assets based on each of the relative filepaths.

16. The computing system of claim 11, wherein:
a first endpoint store in the plurality of endpoint stores is an object store that stores objects; and
a second endpoint store in the plurality of endpoint stores is a data store that stores files.

17. One or more non-transitory computer-readable storage media including instructions that, when executed by one or more processors, cause the one or more processors to perform the steps of:
determining a manifest associated with a given user of an application, wherein the manifest identifies:
one or more assets of a plurality of assets stored in distributed storage services of a distributed network, wherein the one or more assets of the plurality of assets are accessible by the given user, wherein at least one asset of the one or more assets comprises a portion of data associated with a content item;
for each of the one or more assets, one of a plurality of endpoint stores that stores data associated with the asset; and
for each of the one or more assets, one of the plurality of endpoint stores that stores metadata associated with the asset, wherein metadata associated with the at least one asset comprises a portion of metadata associated with the content item;
configuring, based on the manifest, a user namespace associated with the given user that includes a unique reference for each of the one or more assets, wherein the manifest provides access to the given user to the one or more assets and filters out access to other assets from the plurality of assets; and
presenting the user namespace to the given user via a user interface, wherein the user interface is configured to provide access to the one or more assets.

18. The one or more non-transitory computer-readable storage media of claim 17, further including instructions that, when executed by the one or more processors, cause the one or more processors to perform the steps of:

receiving a request for unique reference included in the user namespace, wherein the unique reference is for a first asset of the one or more assets;

sending a first request for first metadata to a first endpoint store of the plurality of endpoint stores that stores the first metadata associated with the first asset;

receiving the first metadata from the first endpoint store;

sending a second request for first data to a second endpoint store of the plurality of endpoint stores that stores the first data associated with the first asset;

receiving the first data from the second endpoint store; and generating a file, corresponding to the first asset, that includes the first data and the first metadata.

19. The one or more non-transitory computer-readable storage media of claim 18, further including instructions that, when executed by the one or more processors, cause the one or more processors to perform the steps of:

determining that a write operation has been performed on the file to generate an update file that includes second data and second metadata;

transmitting the second metadata to the first endpoint store; and transmitting second data to the second endpoint store.

20. The one or more non-transitory computer-readable storage media of claim 17, further including instructions that, when executed by the one or more processors, cause the one or more processors to perform the steps of:

determining an update to the manifest, wherein an updated set of one or more assets that are accessible by the given user differs from the one or more assets accessible by the given user; and updating, based on the updated manifest, the user namespace to include unique references for each of the updated set of one or more assets.

* * * * *

UNITED STATES PATENT AND TRADEMARK OFFICE
CERTIFICATE OF CORRECTION

| | |
|---|---|
| PATENT NO. | : 11,829,500 B2 |
| APPLICATION NO. | : 17/013288 |
| DATED | : November 28, 2023 |
| INVENTOR(S) | : Kishore Udayashankar Kasi et al. |

It is certified that error appears in the above-identified patent and that said Letters Patent is hereby corrected as shown below:

On the Title Page

Item (60) Please insert:
--Related U.S. Application Data
(60) Provisional application No. 63/054,185, filed July 20, 2020.--

Signed and Sealed this
Seventeenth Day of September, 2024

Katherine Kelly Vidal
*Director of the United States Patent and Trademark Office*